United States Patent
Suzuki (10) Patent No.: US 7,813,626 B2
(45) Date of Patent: Oct. 12, 2010

(54) MOTOR CONTROLLER AND ELECTRIC POWER STEERING APPARATUS

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 256 days.

(21) Appl. No.: 12/024,647

(22) Filed: Feb. 1, 2008

(65) Prior Publication Data

US 2008/0185983 A1    Aug. 7, 2008

(30) Foreign Application Priority Data

Feb. 5, 2007    (JP)    ............... 2007-025538

(51) Int. Cl.
H02P 7/285    (2006.01)
H03D 13/00    (2006.01)
(52) U.S. Cl. .................. 388/812; 318/400.02; 318/432; 318/434
(58) Field of Classification Search ................. 388/812; 318/400.02, 432, 434
See application file for complete search history.

(56) References Cited

U.S. PATENT DOCUMENTS

| | | | |
|---|---|---|---|
| 4,697,130 A | 9/1987 | Dadpey et al. | |
| 5,689,170 A | 11/1997 | Ishikawa | |
| 6,037,741 A | 3/2000 | Yamada et al. | |
| 6,130,494 A | 10/2000 | Schob | |
| 6,297,574 B1 | 10/2001 | Schob et al. | |
| 6,504,336 B2 | 1/2003 | Sakamaki | |
| 6,639,379 B2 | 10/2003 | Matsushita et al. | |
| 6,741,060 B2 * | 5/2004 | Krefta et al. | ................. 318/727 |
| 6,927,548 B2 | 8/2005 | Nishizaki et al. | |
| 7,091,684 B2 | 8/2006 | Kobayashi et al. | |
| 7,141,948 B2 | 11/2006 | Kifuku et al. | |
| 7,161,317 B2 | 1/2007 | Matsushita et al. | |
| 7,188,702 B2 | 3/2007 | Takagi et al. | |
| 7,199,538 B2 | 4/2007 | Kameya | |
| 7,240,761 B2 | 7/2007 | Nagase et al. | |

(Continued)

FOREIGN PATENT DOCUMENTS

JP    2003-26020    1/2003

(Continued)

OTHER PUBLICATIONS

U.S. Appl. No. 12/128,304, filed May 28, 2008, Suzuki.

(Continued)

*Primary Examiner*—Bentsu Ro
*Assistant Examiner*—Erick Glass
(74) *Attorney, Agent, or Firm*—Oblon, Spivak, McClelland, Maier & Neustadt, L.L.P.

(57) ABSTRACT

A microcomputer (an electric current command value calculating section) carries out field weakening control in which a d-axis electric current command value Id* is set to a negative value in correspondence with rotation angular velocity ω of a motor. The microcomputer determines whether an anomaly has occurred in an EPS. If it is determined that an anomaly is in a power supply system (step 202: YES), the microcomputer determines whether the anomaly in the power supply system is failure of electric current flow in any phase (step 203). If it is determined that electric current flow has failed in a certain phase, the microcomputer prohibits the field weakening control and outputs a motor control signal instructing to use two other phases free from the failure of electric current flow as electric current flowing phases (two phase drive mode, step 204).

8 Claims, 4 Drawing Sheets

U.S. PATENT DOCUMENTS

| | | | |
|---|---|---|---|
| 7,298,109 | B2 | 11/2007 | Sakamaki et al. |
| 7,348,756 | B2 * | 3/2008 | Ma et al. ............ 318/803 |
| 7,474,067 | B2 | 1/2009 | Ueda et al. |
| 2002/0145837 | A1 * | 10/2002 | Krefta et al. ............ 361/23 |
| 2005/0125124 | A1 | 6/2005 | Nagase et al. |
| 2008/0067960 | A1 | 3/2008 | Maeda et al. |
| 2009/0192665 | A1 | 7/2009 | Nozawa |

OTHER PUBLICATIONS

U.S. Appl. No. 12/209,524, filed Sep. 12, 2008, Suzuki.
U.S. Appl. No. 12/212,165, filed Sep. 17, 2008, Suzuki.
U.S. Appl. No. 12/036,670, filed Feb. 25, 2008, Suzuki.
U.S. Appl. No. 12/036,614, filed Feb. 25, 2008, Suzuki.
U.S. Appl. No. 12/036,733, filed Feb. 25, 2008, Suzuki.
U.S. Appl. No. 12/139,054, filed Jun. 13, 2008, Suzuki.
USPTO Notice of Allowance and Fee(s) Due for co-pending U.S. Appl. No. 12/128,304, Apr. 19, 2010, 16 pages.
USPTO Quayle Office Action for co-pending U.S. Appl. No. 12/036,614, May 25, 2010, 17 pages.
Notice of Allowance dated May 25, 2010 in U.S. Appl. No. 12/036,733, 8 pages.

* cited by examiner

MOTOR CONTROLLER AND ELECTRIC POWER STEERING APPARATUS

This application is based on and claims priority from Japanese Patent Application No. 2007-025538 filed on Feb. 5, 2007, the entire contents of which are incorporated herein by reference.

BACKGROUND OF THE INVENTION

The present invention relates to a motor controller and an electric power steering apparatus.

In many cases, conventional motor controllers of electric power steering apparatuses (EPS) include anomaly detecting means. The anomaly detecting means detects an anomaly when flow of electric current fails in any one of U, V, and W phases, due to a break in power supply lines or damage to contacts of a driver circuit. When such an anomaly is detected, control of operation of a motor is quickly stopped and thus fail safe is performed.

However, in the EPS, if the control of the operation of the motor is suspended, the steering characteristics are greatly changed. Specifically, increased steering force becomes necessary for the driver to accurately manipulate a steering wheel. In this regard, Japanese Laid-Open Patent Publication No. 2003-26020, for example, discloses a motor controller that, even if a failure of electric current flow is detected in a certain phase, continuously controls the operation of a motor by employing phases free of failure of electric current flow as electric current flowing phases. In this case, although torque ripple is caused due to decrease of the number of the electric current flowing phases, assist force is continuously applied to a steering system, thus preventing increase of load on the driver caused in the fail safe.

When the steering wheel is manipulated rapidly, the motor of the EPS must be rotated at a high speed exceeding a base speed. In this case, response to such rapid steering is ensured by carrying out field weakening control.

When used in an EPS for which improved silence is required, a motor is driven usually by supply of sine wave electric current. In many of such cases, detected phase electric current values are converted into d-axis and q-axis electric currents of a d/q coordinate system. Feedback control is then performed in the d/q coordinate system in order to generate and output a motor control signal for carrying out the supply of the sine wave electric current. Field weakening control is carried out by setting a d-axis electric current command value of the feedback control to a negative value corresponding to rotation angular velocity of the motor. In other words, using demagnetizing magnetomotive force produced by counteraction of a d-axis armature caused by a d-axis electric current flowing in a negative direction, magnetic flux in a d-axis direction including permanent magnetic flux is decreased. This widens the operating range of the motor to the high speed exceeding the base speed.

Figure 5:
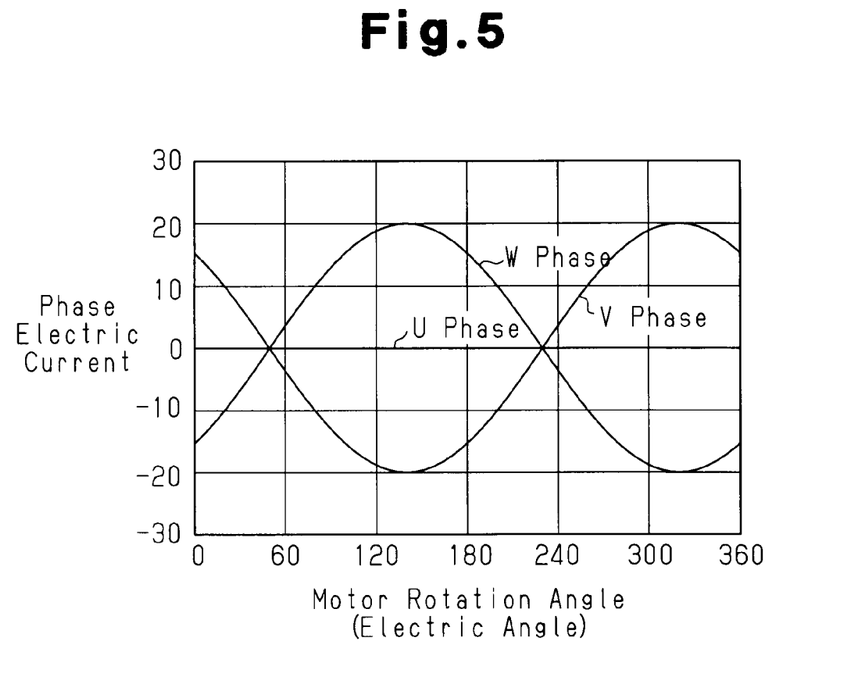
FIG. 5 is a graph representing a two phase drive mode in which two phases free from failure of electric current flow are employed as electric current flowing phases.
Figure 6:
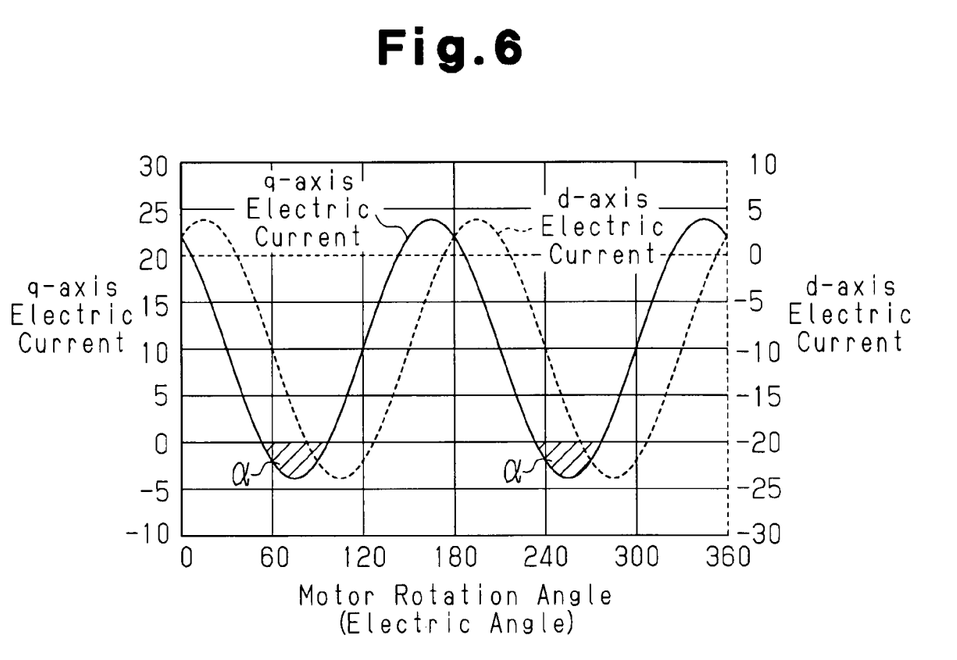
FIG. 6 is a graph representing reverse rotation of a motor in the two phase drive mode.

However, in the conventional case in which the motor is continuously operated using the phases free from failure of electric current supply as the electric current flowing phases after detection of such failure, the motor might be rotated in a reverse direction if the field weakening control is performed. Specifically, the conventional case employs d-axis noninteracting control in which the d-axis electric current command value is set to "zero". If feedback control using a negative d-axis electric current command value is performed in a two-phase drive mode (failure of electric current flow in the U phase with normal electric current flows in the V and W phases) as illustrated in FIG. 5, a q-axis electric current is generated in a negative direction as illustrated in FIG. 6 (as indicated by the hatched areas α of the graph). As a result, assist force may be generated in the direction opposite to the direction in which the steering wheel is manipulated.

SUMMARY OF THE INVENTION

Accordingly, it is an objective of the present invention to provide a motor controller and an electric power steering apparatus that ensure a wide range of rotational speed of a motor, and prevent reverse rotation of the motor in non-normal control that is performed when failure of electric current flow is detected in a certain phase.

To achieve the foregoing objective and in accordance with one aspect of the present invention, a motor controller having, motor control signal output means that outputs a motor control signal, a driver circuit that supplies a three phase drive power to a motor based on the motor control signal, and anomaly detecting means is provided. The motor control signal output means includes electric current command value calculating means and motor control signal generating means. The electric current command value calculating means calculates a d-axis electric current command value and a q-axis electric current command value of a d/q coordinate system as electric current command values. The motor control signal generating means converts each of detected phase electric current values of the motor into a d-axis electric current value and a q-axis electric current value of the d-q coordinate system, and generates the motor control signal by performing feedback control in such a manner that the d-axis electric current value and the q-axis electric current value follow the d-axis electric current command value and the q-axis electric current command value that have been calculated. The motor control signal output means performs a field weakening control in which the d-axis electric current command value is set to a negative value in correspondence with an rotation angular velocity of the motor. The anomaly detecting means detects an anomaly if flow of electric current fails in any of phases of the motor. If the anomaly is detected, the motor control signal output means outputs the motor control signal instructing to use phases free from the anomaly as electric current flowing phases, and prohibits the field weakening control.

DETAILED DESCRIPTION OF THE PREFERRED EMBODIMENTS

An embodiment of the present invention, which is an electric power steering apparatus (an EPS), will now be described with reference to the attached drawings.

Figure 1:
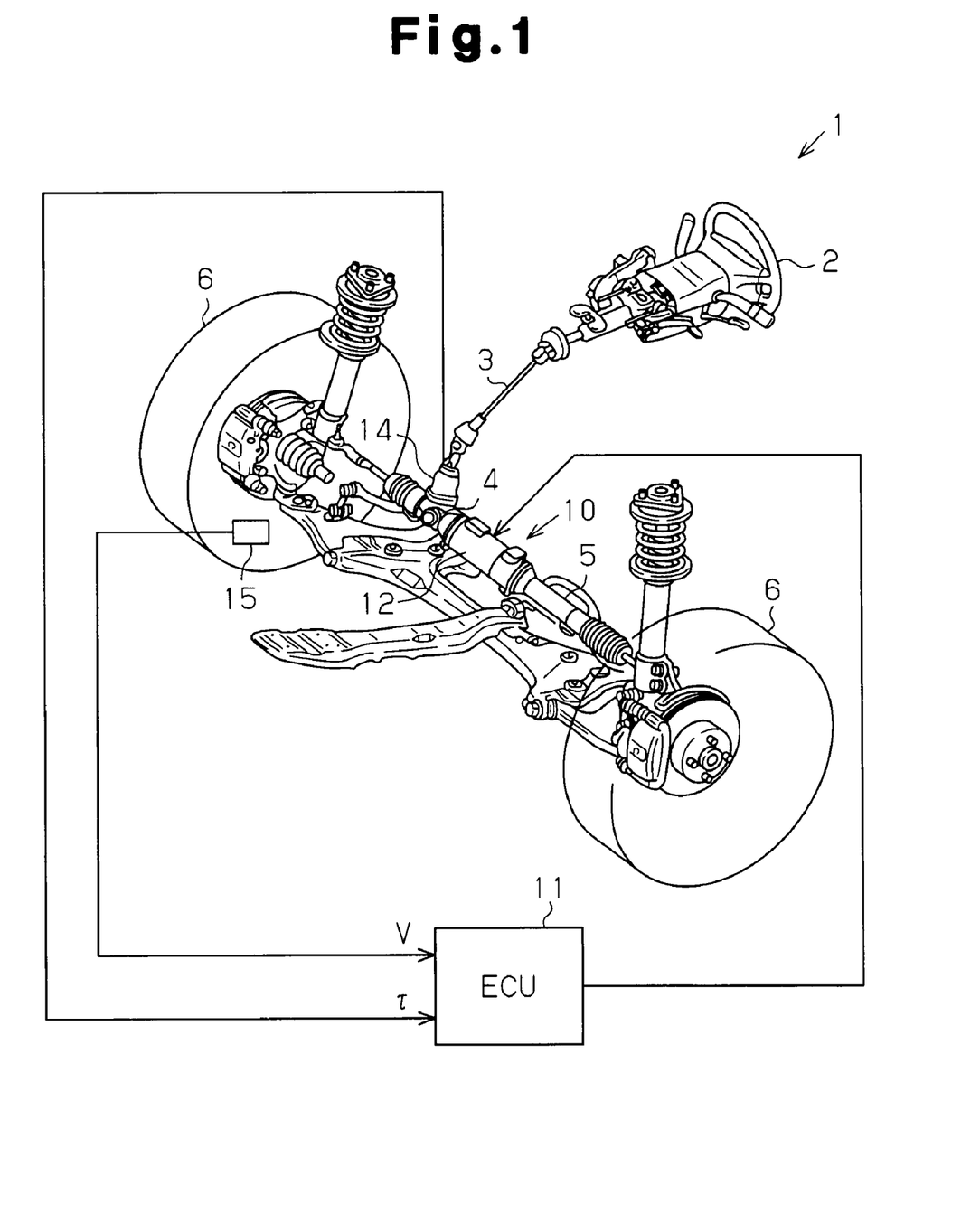
FIG. 1 is a schematic view showing an electric power steering apparatus (EPS)

As shown in FIG. 1, a steering wheel 2 is fixed to a steering shaft 3. The steering shaft 3 is connected to a rack 5 through a rack-and-pinion mechanism 4. The steering shaft 3 is rotated through steering. The rotation of the steering shaft 3 is converted into linear reciprocation of the rack 5 through the rack-and-pinion mechanism 4. This changes steering angles of steerable wheels 6.

An EPS 1 has an EPS actuator 10 and an ECU 11. The EPS actuator 10 is a steering force assisting device that applies assist force to a steering system in order to assist steering. The ECU 11 is control means that controls operation of the EPS actuator 10.

The EPS actuator 10 is a rack type EPC actuator and is powered by a motor 12, or a drive source, which is arranged coaxially with the rack 5. In the EPS actuator 10, the motor 12 generates assist torque, which is transmitted to the rack 5 through a ball screw mechanism (not shown). The motor 12 is a brushless type and driven by three-phase (U, V, and W phases) drive power supplied from the ECU 11. The ECU 11 as a motor controller adjusts the assist force applied to the steering system by regulating the assist torque produced by the motor 12 (power assist control).

A torque sensor 14 and a vehicle speed sensor 15 are connected to the ECU 11. The ECU 11 operates the EPS actuator 10, or carries out the power assist control, based on a steering torque τ and a vehicle speed V, which are detected by the torque sensor 14 and the vehicle speed sensor 15, respectively.

The electrical configuration of the EPS 1 according to the illustrated embodiment will hereafter be explained.

Figure 2:
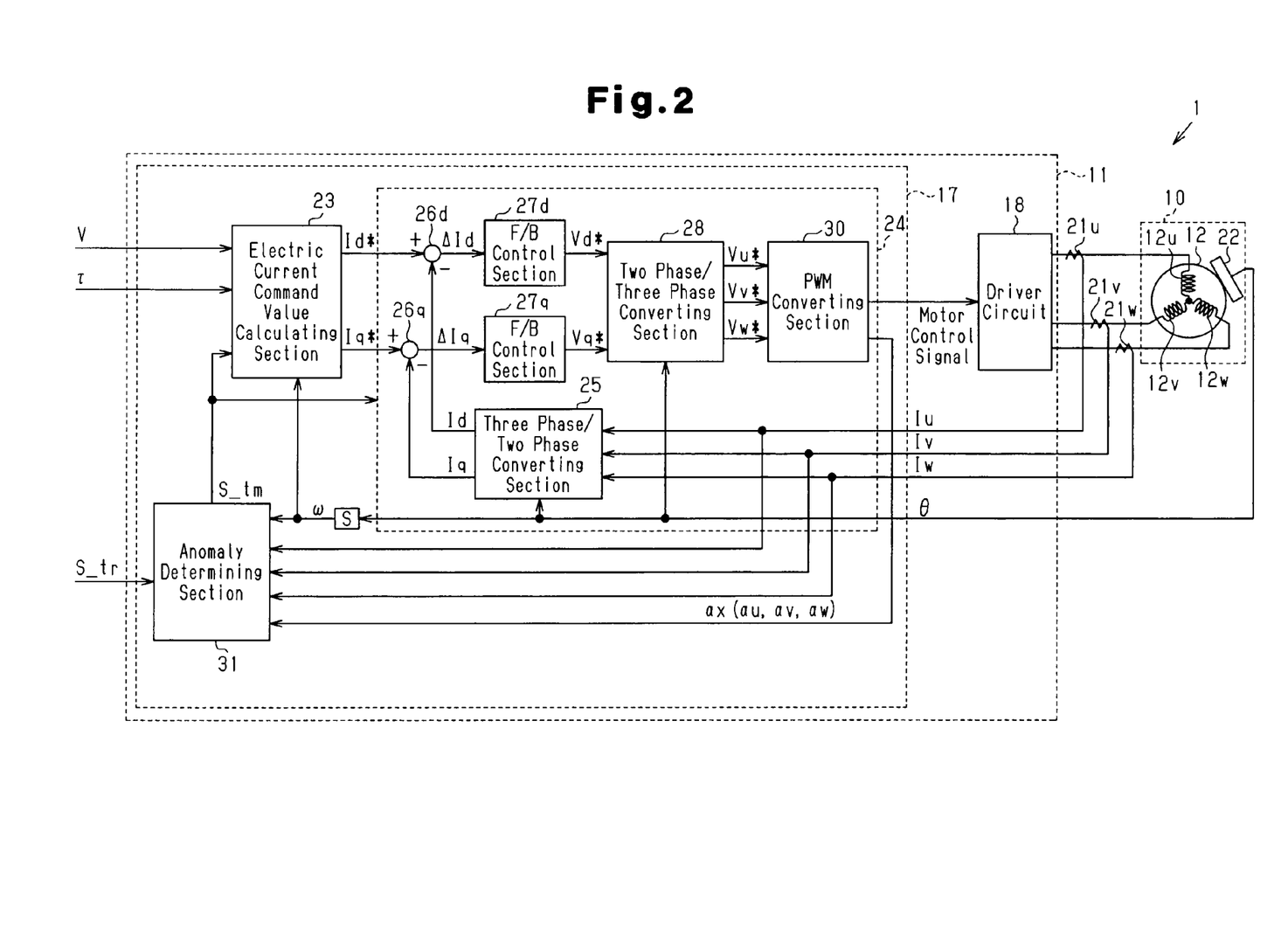
FIG. 2 is a block diagram representing the configuration of the EPS.

As illustrated in FIG. 2, the ECU 11 has a microcomputer 17 and a driver circuit 18. The microcomputer 17 is motor control signal output means that outputs a motor control signal. The driver circuit 18 supplies the three-phase power to the motor 12 based on the motor control signal.

The driver circuit 18 is a publicly known PWM inverter that is configured by connecting three basic units (arms) corresponding to the respective phases in parallel. Each of the basic units is formed by a pair of switching elements that are connected in series. The motor control signal, which is output by the microcomputer 17, defines ON duty ratio of each of the switching elements, which form the driver circuit 18. When the motor control signal is provided to the gate terminal of each switching element, the switching element is turned selectively on and off in response to the motor control signal. This converts DC voltage of a power source (not shown) mounted in the vehicle to the three-phase (U, V, and W phases) drive power. The drive power is then supplied to the motor 12.

The ECU 11 has electric current sensors 21$u$, 21$v$, and 21$w$, which detect phase electric current values Iu, Iv, and Iw, respectively, and a rotation angle sensor 22 detecting a rotation angle θ of the motor 12. Based on the phase electric current values Iu, Iv, Iw and the rotation angle θ of the motor 12, which are detected based on detection signals of these sensors, and the steering torque τ and the vehicle speed V, the microcomputer 17 outputs the motor control signal to the driver circuit 18.

The microcomputer 17 includes an electric current command value calculating section 23 serving as electric current command value calculating means and a motor control signal generating section 24 serving as motor control signal generating means. The electric current command value calculating section 23 calculates an electric current command value as a target control amount of the assist force applied to the steering system. The motor control signal generating section 24 generates the motor control signal based on the electric current command value, which is provided by the electric current command value calculating section 23.

The electric current command value calculating section 23 calculates a d-axis electric current command value Id* and a q-axis electric current command value Iq* based on the steering torque τ and the vehicle speed V, which are detected by the torque sensor 14 and the vehicle speed sensor 15, respectively. The electric current command value calculating section 23 then outputs the obtained d-axis electric current command value Id* and q-axis electric current command value Iq* to the motor control signal generating section 24. Along with the d-axis electric current command value Id* and the q-axis electric current command value Iq*, which are provided by the electric current command value calculating section 23, the motor control signal generating section 24 receives the phase electric current values Iu, Iv, Iw detected by the corresponding electric current sensors 21$u$, 21$v$, 21$w$ and the rotation angle θ detected by the rotation angle sensor 22. Based on the phase electric current values Iu, Iv, Iw and the rotation angle θ (the electric angle), the motor control signal generating section 24 generates the motor control signal by performing feedback control on electric currents in the d-q coordinate system.

In the motor control signal generating section 24, the phase electric current values Iu, Iv, Iw are input to a three phase/two phase converting section 25 together with the rotation angle θ. The three phase/two phase converting section 25 converts the phase electric current values Iu, Iv, Iw into the d-axis electric current value Id and the q-axis electric current value Iq of the d/q coordinate system. The q-axis electric current command value Iq*, which is output by the electric current command value calculating section 23, is input to a subtractor 26$q$, together with the q-axis electric current value Iq. The d-axis electric current command value Id*, which is output also by the electric current command value calculating section 23, is input to a subtractor 26$d$, together with the d-axis electric current value Id. When field weakening control is not carried out, the electric current command value calculating section 23 outputs "0" as the d-axis electric current command value Id (Id*=0). The subtractor 26$d$ obtains a d-axis electric current deviation ΔId and the subtractor 26$q$ determines a q-axis electric current deviation ΔIq. The d-axis electric current deviation ΔId and the q-axis electric current deviation ΔIq are then input to corresponding F/B control sections 27$d$, 27$q$, respectively. The F/B control sections 27$d$, 27$q$ each carry out feedback control in such a manner that the d-axis electric current value Id and the q-axis electric current value Iq, which are actual electric current values, follow the d-axis electric current command value Id* and the q-axis electric current command value Iq*, respectively, which are provided by the electric current command value calculating section 23.

Specifically, the F/B control section 27$d$ multiplies the d-axis electric current deviation ΔId by a predetermined F/B gain (PI gain), thus obtaining a d-axis voltage command value Vd*. The F/B control section 27$q$ multiplies the q-axis electric current deviation ΔIq by the F/B gain and thus determines a q-axis voltage command value Vq*. The d-axis voltage command value Vd* and the q-axis voltage command value Vq*, which are provided by the corresponding F/B control sections 27$d$, 27$q$, are input to a two phase/three phase converting section 28, together with the rotation angle θ. The two phase/three phase converting section 28 converts the d-axis voltage command value Vd* and the q-axis voltage command value Vq* to three-phase voltage command values Vu*, Vv*, and Vw*.

The voltage command values Vu*, Vv*, Vw*, which are obtained by the two phase/three phase converting section 28, are input to a PWM converting section 30. The PWM converting section 30 generates duty command values αu, αv, and αw based on the voltage command values Vu*, Vv*, and Vw*. The motor control signal generating section 24 generates a motor control signal having an ON duty ratio corresponding to each of the duty command values αu, αv, αw. The microcomputer 17 outputs the motor control signal to the gate terminal of each switching element of the driver circuit 18. The microcomputer 17 thus controls operation of the driver circuit 18, or supply of drive power to the motor 12.

A rotation angular velocity ω of the motor 12 is input to the electric current command value calculating section 23. In correspondence with the rotation angular velocity speed ω, the electric current command value calculating section 23 performs the field weakening control in which the d-axis electric current command value Id* is set to a negative value. Specifically, as the rotation angular velocity ω increases, back electromotive forces produced by motor coils 12u, 12v, and 12w of the respective phases increase. This sets an upper limit (a base speed) of the rotation speed of the motor 12. However, by providing a d-axis electric current flowing in a negative direction by setting the d-axis electric current command value Id* to a negative value, magnetic flux in a d-axis direction is decreased using demagnetizing magnetomotive force produced through counteraction of the d-axis armature. In the illustrated embodiment, the field weakening control performed in correspondence with the rotation angular velocity ω of the motor 12 widens the operating range of the motor 12 to a high speed range exceeding the base speed.

(Control Performed when Anomaly Occurs)

The ECU 11 of the illustrated embodiment operates in the following manner if an anomaly occurs.

With reference to FIG. 2, the microcomputer 17 has an anomaly determining section 31 that identifies the nature of an anomaly when any anomaly occurs in the EPS 1. The ECU 11 (the microcomputer 17) changes control modes of the motor 12 in correspondence with the nature of the anomaly identified (determined) by the anomaly determining section 31.

An anomaly signal S_tr, in accordance with which an anomaly is detected in the mechanical structure of the EPS actuator 10, is input to the anomaly determining section 31. In response to the anomaly signal S_tr, the anomaly determining section 31 detects an anomaly in the mechanical system of the EPS 1. Also, the phase electric current values Iu, Iv, Iw and the rotation angular velocity ω of the motor 12 and the duty command values αu, αv, αw of the respective phases are input to the anomaly determining section 31. Based on these condition amounts, the anomaly determining section 31 detects an anomaly of the torque sensor 14 or an anomaly of a power supply system for the motor 12, which is an overcurrent or failure of electric current flow in a certain phase caused by a break of a power cable (including a motor coil) or contact failure of the driver circuit 18.

If a phase electric current value Ix of X phase (X=U, V, or W) is smaller than or equal to a predetermined value Ith (|Ix|≦Ith) and the rotation angular velocity ω is in a target range of determination whether a break has occurred (|ω|≦ω0), failure of electric current flow is detected in the phase depending on whether the duty command value αx corresponding to the phase is continuously maintained outside the range corresponding to the value Ith and a threshold value ω0 (αLo≦αx≦αHi).

Figure 3:
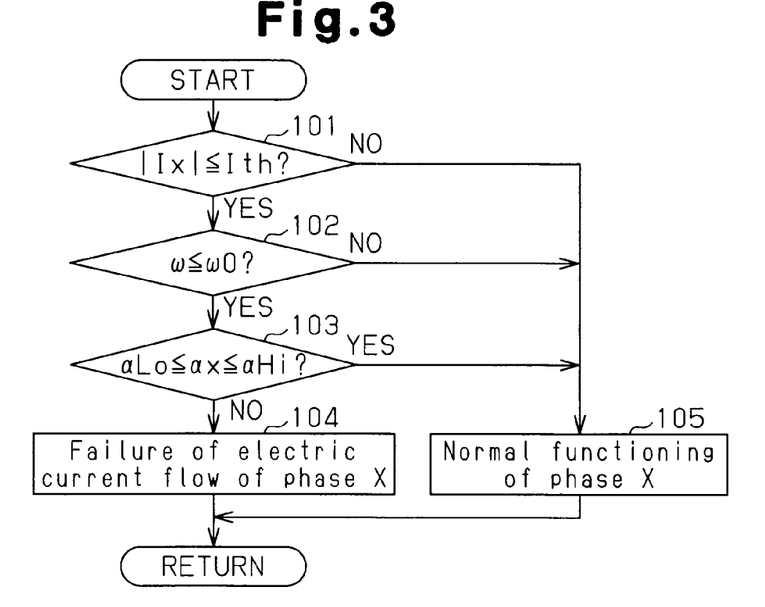
FIG. 3 is a flowchart representing a procedure for detecting a phase in which electric current flow has failed.

With reference to the flowchart of FIG. 3, the anomaly determining section 31 determines whether (the absolute value of) the detected phase electric current value Ix is smaller than or equal to the value Ith (step 101). If the phase electric current value Ix is smaller than or equal to the value Ith (|Ix|≦Ith, step 101: YES), the anomaly determining section 31 determines whether (the absolute value of) the rotation angular velocity ω is smaller than or equal to the predetermined threshold value ω0 (step 102). If the rotation angular velocity ω is smaller than or equal to the threshold value ω0 (|ω|≦ω0, step 102), the anomaly determining section 31 determines whether the duty command value αx is in the predetermined range (αLo≦αx≦αHi, step 103). If the duty command value αx is outside the predetermined range (step 103: NO), the anomaly determining section 31 determines that failure of electric current flow has occurred in the X phase (step 104).

Contrastingly, if the phase electric current supply value Ix is greater than the predetermined value Ith (|Ix|>Ith, step 101: NO), if the rotation angular velocity ω is greater than the threshold value ω0 (|ω|>ω0, step 102: NO), or if the duty command value αx is in the aforementioned predetermined range (αLo≦αx≦αHi, step 103: YES), the anomaly determining section 31 determines that the X phase is free from failure of electric current flow (normal functioning of the X phase determined, step 105).

If the duty command value αx reaches an extreme level without the phase electric current value Ix being decreased to near zero and the rotation speed ω being decreased to near zero, the anomaly determining section 31 determines that the failure of electric current flow has occurred in the X phase. The anomaly determining section 31 identifies the phase in which the failure of electric current flow has occurred by carrying out the above-described determining procedure for the respective U, V, and W phases.

Such determination is performed only if the voltage of the power source is greater than or equal to a specified voltage necessary for driving the motor 12. Detection of an anomaly is eventually determined in a predetermined step 104 depending on whether determination that the failure of electric current flow has occurred continues over a predetermined period of time.

Based on the result of determination by the anomaly determining section 31, the ECU 11 (the microcomputer 17) switches the control modes of the motor 12. Specifically, the anomaly determining section 31 outputs the result of the determination including detection of the failure of electric current flow to the electric current command value calculating section 23 and the motor control signal generating section 24 as an anomaly detection signal S_tm. The electric current command value calculating section 23 and the motor control signal generating section 24 calculate the d-axis electric current command value Id* and the q-axis electric current command value Iq* in correspondence with the anomaly detection signal S_tm and generate a motor control signal.

More specifically, the ECU 11 has three control modes, which are a "normal control mode" for a normal state, an "assist suspension mode" for a state in which an anomaly has been caused and thus the motor 12 must be stopped, and a "two phase drive mode" for a state in which failure of electric current flow has occurred in any one of the phases of the motor 12. If the anomaly detection signal S_tm provided by the anomaly determining section 31 corresponds to the "normal control mode", the electric current command value calculating section 23 and the motor control signal generating section 24 calculate the d-axis electric current command value Id* and the q-axis electric current command value Iq* for the normal state and generate a motor control signal.

If the anomaly detection signal S_tm of the anomaly determining section 31 corresponds to the "assist suspension mode", the electric current command value calculating section 23 and the motor control signal generating section 24 calculate the d-axis electric current command value Id* and the q-axis electric current command value Iq* and generate the motor control signal in such a manner as to stop the motor 12. The "assist suspension mode" is selected when an anomaly is caused in the mechanical system or the torque sensor 14 or when an overcurrent, which is an anomaly, is caused in the power supply system. Further, in accordance with the "assist suspension mode", the motor 12 may be stopped immediately or after the output of the motor 12, or the assist force, is gradually decreased. In the latter case, (the absolute value) of the q-axis electric current command value Iq*, which is provided by the electric current command value calculating section 23, is gradually decreased. After stopping the motor 12, the microcomputer 17 switches the switching elements of the driver circuit 18 to open states and opens a non-illustrated power source relay.

The anomaly detection signal S_tm corresponding to the "two phase drive mode" contains information for identifying the phase in which the failure of electric current flow occurred. If the anomaly detection signal S_tm provided by the anomaly determining section 31 corresponds to the "two phase drive mode", the motor control signal generating section 24 generates a motor control signal instructing to use the two phases free from failure of electric current flow (which are, for example, the V phase and the W phase if the failure of electric current flow has occurred in the U phase, see FIG. 5) as electric current flowing phases. If the anomaly detection signal S_tm corresponding to the "two phase drive mode" is input to the electric current command value calculating section 23, the electric current command value calculating section 23 sets the d-axis electric current command value id*, which is provided by the electric current command value calculating section 23, to "0" (Id*=0), without executing the field weakening control. In this manner, the generation of a q-axis electric current flowing in a negative direction, as illustrated in FIG. 6, is avoided. In other words, the motor 12 is prevented from rotating in a reverse direction. This prevents the assist force from being applied to the steering system in the direction opposite to the steering direction.

A procedure performed by the microcomputer 17 to determine whether an anomaly has occurred and switch the control modes will now be described.

Figure 4:
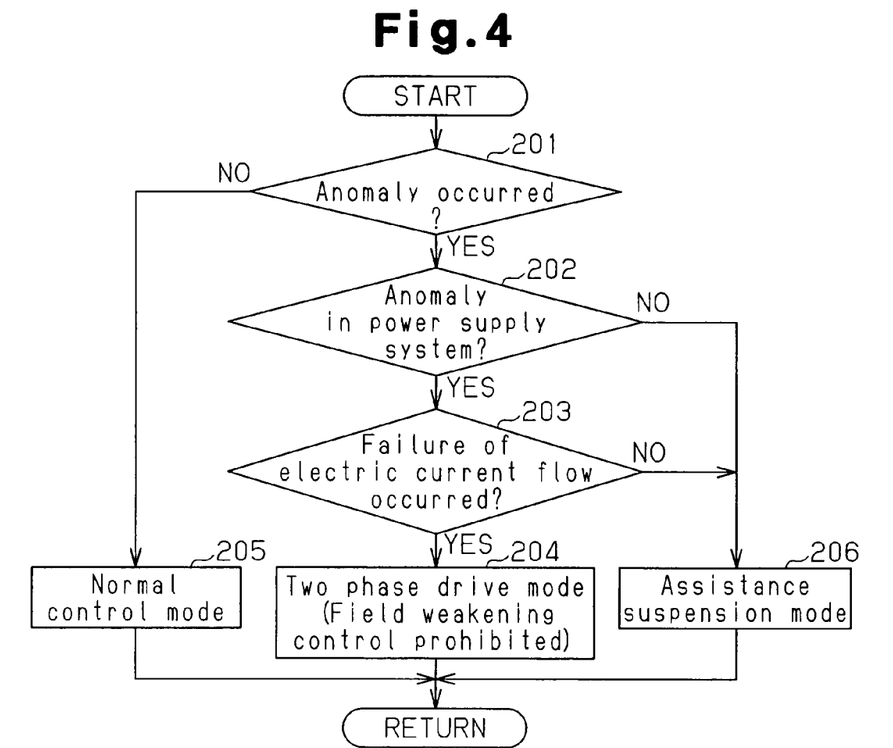
FIG. 4 is a flowchart representing a procedure for determining whether an anomaly has occurred and switching control modes.

As illustrated in the flowchart of FIG. 4, the microcomputer 17 first determines whether an anomaly has occurred (step 201). If it is determined that an anomaly has occurred (step 201: YES), the microcomputer 17 determines whether the anomaly is in the power supply system (step 202). If it is determined that the anomaly is in the power supply system (step 202: YES), the microcomputer 17 determines whether the anomaly of the power supply system corresponds to failure of electric current flow in a certain one of the phases (step 203). If it is determined that such failure of electric current flow has occurred in the phase (step 203: YES), the microcomputer 17 prohibits execution of the field weakening control and outputs the motor control signal instructing to use the other two of the phases free from failure of electric current flow as the electric current flowing phases (the two phase drive mode, step 204).

If it is determined that there is no anomaly in step 201 (step 201: NO), the microcomputer 17 provides a normal motor control signal (the normal control mode, step 205). If it is determined that the anomaly has occurred outside the power supply system in step 202 (step 202: NO) or that the anomaly is other than the failure of electric current flow brought about in any of the phases in step 203 (step 203: NO), the microcomputer 17 outputs the motor control signal instructing to stop the motor 12 and opens the power source relay.

The illustrated embodiment has the following advantage.

(1) The microcomputer 17 (the electric current command value calculating section 23) performs the field weakening control in which the d-axis electric current command value Id* is set to a negative value in correspondence with the rotation angular velocity ω of the motor 12. The microcomputer 17 also determines whether an anomaly has occurred in the EPS 1. If it is determined that an anomaly has occurred in the power supply system (step 202: YES), the microcomputer 17 determines whether the anomaly corresponds to failure of electric current flow in any one of the phases (step 203). If it is determined that the anomaly corresponds to the failure of electric current flow in the phase, the microcomputer 17 prohibits the field weakening control and outputs the motor control signal instructing to use the other two of the phases free from failure of electric current flow as the electric current flowing phases (the two phase drive mode, step 204).

Accordingly, in the normal state, the field weakening control is carried out to widen the operating range of the motor 12. However, if the failure of electric current flow has occurred in any one of the phases, the motor 12 is continuously operated using the two other phases as the electric current flowing phases. In this manner, the assist force is continuously applied to the steering system to reduce the load on the driver of the vehicle. Further, the field weakening control is prevented from being carried out in the two phase drive mode in which the two phases are used as the electric current flowing phases. This prevents the motor 12 from rotating in a reverse direction so that the assist force is not generated in the direction opposite to the steering direction.

The illustrated embodiment may be modified in the following forms.

The present invention may be embodied as a motor controller used for purposes other than the use in an electric power steering apparatus (EPS).

In the illustrated embodiment, the ECU 11 operates in the three control modes, which are the "normal control mode", the "assist suspension mode", and the "two phase drive mode". However, the operating modes of the motor 12 when an anomaly is detected are not restricted to these modes. In other words, as long as the field weakening control is not performed when the motor 12 is operated with the two normally functioning phases free from failure of electric current flow used as the electric current flowing phases, the motor 12 may be operated in any other suitable modes. Also, the method for detecting an anomaly (determining whether an anomaly has occurred) is not restricted to the method of the illustrated embodiment.

The invention claimed is:

1. A motor controller comprising:
motor control signal output means that outputs a motor control signal;
a driver circuit that supplies a three phase drive power to a motor based on the motor control signal; and
anomaly detecting means,
wherein the motor control signal output means includes electric current command value calculating means and motor control signal generating means,
wherein the electric current command value calculating means calculates a d-axis electric current command value and a q-axis electric current command value of a d/q coordinate system as electric current command values,
wherein the motor control signal generating means converts each of detected phase electric current values of the motor into a d-axis electric current value and a q-axis electric current value of the d-q coordinate system, and generates the motor control signal by performing feedback control in such a manner that the d-axis electric current value and the q-axis electric current value follow the d-axis electric current command value and the q-axis electric current command value that have been calculated, wherein the motor control signal output means performs a field weakening control in which the d-axis electric current command value is set to a negative value in correspondence with an rotation angular velocity of the motor, wherein the anomaly detecting means detects an anomaly if flow of electric current fails in any of phases of the motor, and wherein, if the anomaly is detected, the motor control signal output means outputs the motor control signal instructing to use phases free from the anomaly as electric current flowing phases, and prohibits the field weakening control.

2. The motor controller according to claim 1, wherein the anomaly detecting means detects a phase in which the electric current flow has failed based on the phase electric current values of the motor, the rotation angular velocity of the motor, and duty command values of the phases.

3. The motor controller according to claim 2, wherein the anomaly detecting means determines that the electric current flow has failed in a certain one of the phases if the phase electric current value of the phase is smaller than or equal to a predetermined value, the rotation angular velocity of the phase is smaller than or equal to a predetermined value, and the duty command value of the phase is outside a predetermined range.

4. The motor controller according to claim 3, wherein the anomaly detecting means determines that the electric current flow has failed in the phase if the state continues for a predetermined period of time or longer, in which state the phase electric current value of the phase is smaller than or equal to the predetermined value, the rotation angular velocity of the phase is smaller than or equal to the predetermined value, and the duty command value of the phase is outside the predetermined range.

5. The motor controller according to claim 1, wherein, if the anomaly is detected, the electric current command value calculating means sets the d-axis electric current command value to zero.

6. The motor controller according to claim 1, wherein the motor control signal output means suspends operation of the motor if an anomaly other than a failed electric current flow is detected.

7. An electric power steering apparatus including the motor controller according to claim 1.

8. The electric power steering apparatus according to claim 7, comprising a rack that is arranged between a pair of opposing steerable wheels, extends in a direction of a width of a vehicle, and changes a steering angle of each of the steerable wheels, wherein the motor is arranged coaxially with the rack.

* * * * *